United States Patent [19]

Peter et al.

[11] 4,226,596
[45] Oct. 7, 1980

[54] PROCESS FOR PRINTING UNIONS

[75] Inventors: Richard Peter, Basel; Hans D. Kirner, Pratteln; Rolf Gehrlein, Muttenz, all of Switzerland

[73] Assignee: Rohner AG Pratteln, Switzerland

[21] Appl. No.: 958,781

[22] Filed: Nov. 8, 1978

[30] Foreign Application Priority Data

Nov. 11, 1977 [CH] Switzerland ............... 13825/77

[51] Int. Cl.$^3$ .............................................. D06P 3/82
[52] U.S. Cl. .......................................... 8/532; 8/528; 8/529; 8/543
[58] Field of Search ............................... 8/21 R, 21 C

[56] References Cited

U.S. PATENT DOCUMENTS

| | | | |
|---|---|---|---|
| 2,089,212 | 8/1937 | Kritchovsky | 260/124 |
| 2,232,460 | 2/1941 | Klein | 8/21 R |
| 2,248,091 | 7/1941 | Kirst et al. | 8/21 R |
| 3,993,438 | 11/1976 | Fishwick et al. | 8/21 C |
| 4,115,055 | 9/1978 | Kirner et al. | 8/26 |

FOREIGN PATENT DOCUMENTS 575505 5/1976 Switzerland .

*Primary Examiner*—Maurice J. Welsh
*Attorney, Agent, or Firm*—Finnegan, Henderson, Farabow, Garrett & Dunner

[57] ABSTRACT

The unions consist of a mixture of fibers which can be colored with disperse dyestuffs and fibers which can be colored with reactive dyestuffs. A printing paste containing:

(a) at least one finely dispersed, water-insoluble azo dye-stuff of the formula:

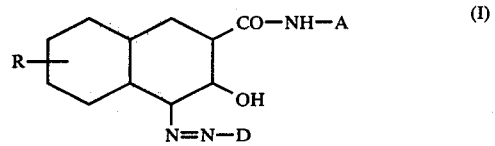

(b) at least one reactive dyestuff and
(c) at least one non-ionic surfactant is used. The azo dyestuff of formula I is not prepared in the printing paste. It has a melting point between 220° and 300° C. In the formula, A, D and R have the meanings given in claim 1.

In this way, prints are obtained, from which the non-fixed dyestuffs can easily be washed out and which have an excellent white ground. The build-up and fastness properties are good. The prints are very brilliant and deep in color, in particular in the field of orange and red shades.

17 Claims, No Drawings

PROCESS FOR PRINTING UNIONS

The present invention relates to a novel process for printing unions consisting of mixtures of fibers which can be coloured with disperse dyestuffs and fibers which can be coloured with reactive dyestuffs. The invention further relates to the printing pastes used to carry out the process and to the textile materials printed according to the process.

Numerous processes for printing unions, in particular textile materials consisting of mixtures of cellulose and polyester, have already been described. Only a few of these processes could also find practical use although they all show varyingly important disadvantages in different respects.

Generally, disperse dyestuffs together with reactive dyestuffs are used for the printing of unions. Often losses of colour yield and dulling of the colour occur thereby because the reactive dyestuff is affected by the disperse dyestuff, in particular by the large amounts of dispersing agents contained in the commercially available disperse dyestuffs. In addition, it is impossible to obtain brilliant shades in the field of red colours in this way.

In Swiss Auslegeschrift No. 4359/74 (Swiss Patent No. 575,505) a process for printing woven unions is described which overcomes further grave disadvantages of the above-mentioned processes, in particular the fact that the dyestuff colouring the polyester (hereinafter called polyester dyestuff) which also adheres to the cellulose portion, is difficult to remove by washing, as well as the renewed building up of the non-fixed polyester dyestuff detached from the union in the washing bath onto the white ground; this cannot even be avoided by careful control of the washing process and by using special auxiliary agents. These undesired effects are said, according to said Auslegeschrift, not to occur if the polyester dyestuff is prepared by coupling developing dyestuff components in situ in the printing paste; such developing dyestuff components are described e.g. in the Colour Index, published by The Society of Dyers and Colorists, under the titles "Azoic Diazo Components" and "Azoic Coupling Components". To colour the cotton portion, reactive dyestuffs are added to the printing paste as normal.

When carefully repeating the process according to the said Auslegeschrift in detail it was shown that the non-fixed polyester dyestuff could really be easily washed out of prints prepared with printing pastes according to the Auslegeschrift and that the non-printed parts show a perfect white ground. However, on the other hand it was shown that the process has some other grave disadvantages. For example, preparing the dyestuff in situ in the printing paste is complicated and associated with many sources of error. The particle size of the azo dyestuff formed depends very much on the concentration and also on the type and size of the agitators and vessels used in the preparation of the printing paste; this is one cause of the bad reproduceability of the prints. Furthermore, the polyester part of the woven union is only weakly coloured; this results particularly in darker shades to a jarring appearance of the goods. Besides this, the prints must either be fixed at high temperatures or by prolonged steaming. Finally, the fastness properties, particular the light fastness of the prints, often do not come up to the lower limit required in practice.

It has now been found that equally good results can be achieved if the polyester dyestuff is not prepared by coupling in the printing paste but in the usual way, is finely dispersed and then added to the printing paste; in this case, it must only be certain that conditions are used which are comparable with those of the Auslegeschrift, especially as regards the type and quantity of the dyestuffs and auxiliary agents used. Therefore the good results of the process described in the above-mentioned Auslegeschrift as regards the washability and white ground are not to be attributed to the preparation of the polyester dyestuff by coupling in the printing paste, but much rather to the physical and chemical properties of the azo dyestuffs used as polyester dyestuffs. It would therefore be possible to have such dyestuffs prepared in the usual way by a dyestuff manufacturer and to obtain them from the same instead of accepting the disadvantages of the coupling in the printing paste, but still achieving the advantages of the process according to the Auslegeschrift such as good washability and perfect white ground. However, the other disadvantages of the process mentioned above are not corrected thereby.

Dyestuffs of a type similar to the azo dyestuffs prepared according to the above-mentioned Auslegeschrift by coupling in the printing paste, are described in Swiss Patent Application No. 3901/75 and the corresponding U.S. Pat. No. 4,115,055. Mixtures of these dyestuffs which have a melting point below 200° C., preferably below 180° C., dye polyester material with good build up and good fastness properties, in particular in the field of the brilliant and pure orange to red shades. However, when printing on unions, they stain the white ground strongly.

A process has now been developed for printing unions consisting of mixtures of fibers which can be coloured with disperse dyestuffs and fibers which can be coloured with reactive dyestuffs; this process surprisingly not only has the advantage that the non-fixed dyestuffs can easily be washed out and a perfect white ground is achieved, but also the advantage that the printing pastes used are simple and safe to produce and prints with good fixability, good fastness properties and brilliant shades are obtained.

The process according to the invention is characterized by using a printing paste containing at least one finely dispersed, water-insoluble azo dyestuff, not prepared in the printing paste and having the formula:

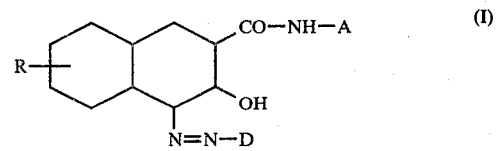

which has a melting point between 220° and 300° C. and wherein D is a phenyl radical free of sulfo and carboxyl groups, this radical bearing at least one electrophilic substituent and optionally up to two low molecular weight alkyl and/or alkoxy groups, R is hydrogen, a halogen atom or an optionally substituted alkoxy group and A is a phenyl radical which can be substituted by one or two optionally substituted alkyl and/or alkoxy groups and/or one halogen atom, as well as at least one reactive dyestuff and at least one non-ionic surfactant, preferably a non-ionic dispersing and/or wetting agent, and applying said printing paste to the unions in a manner known per se.

Preferably, the radical D contains as electrophilic substituent or substituents at least one nitro, cyano, trifluoromethyl and/or alkoxycarbonyl group which preferably contains 1 to 3 carbon atoms in the alkoxy radical, and/or up to two halogen atoms, preferably chlorine and/or bromine atoms. The optional low molecular weight alkyl and/or alkoxy substituents in radical D contain preferably 1 to 4 carbon atoms; they are in particular up to two methyl and/or ethyl and/or methoxy and/or ethoxy groups. R is preferably hydrogen, chlorine, bromine or an alkoxy group with 1 to 4 carbon atoms, in particular methoxy or ethoxy. The alkyl and/or alkoxy substituents in radical A contain preferably 1 to 4 carbon atoms. It is particularly preferred that the ring A is substituted by one or two methyl and/or ethyl and/or methoxy and/or ethoxy groups and/or one chlorine or bromine atom.

The coupling components which can be used in the preparation of the azo dyestuffs of formula I are known; suitable are, for example, the corresponding "Azoic Coupling Components" from the Colour Index, Third Edition, Vol. I, published by The Society of Dyers and Colorists. Corresponding benzene derivatives which are listed in the Colour Index under "Azoic Diazo Components" can be used as diazotizable amines for the preparation of the azo dyestuffs of formula I. However, also suitable for this purpose are other amino compounds of the benzene series which for the most varied reasons cannot usually be converted into stable diazonium salts or which are not commercially available as diazonium salts. This fact allows optimization of the desired properties of the azo dyestuffs of formula I.

It is advantageous if the water-insoluble azo dyestuffs used according to the invention have a particle size below 10 μm (microns), preferably below 5 μm (microns), in particular below 2 μm (microns), and contain relatively small amounts of anionic dispersing agent. They can be prepared according to the azo coupling methods commonly used in the dyestuff industry and then be subjected to grinding. The preparation and the composition of suitable solid or liquid dyestuff compositions which can be produced from the above-defined dyestuffs of formula I and can be used for the process according to the invention are described, e.g. in Swiss Patent Application No. 3499/77 and the corresponding German Patent Application published before examination No. 28 17 453 (solid compositions) and in Swiss Patent Application No. 11728/77 and the corresponding U.S. Patent Application Ser. No. 946,014 (liquid compositions). The liquid compositions contain preferably at least 20% by weight, especially 40 to 50% by weight of dyestuff and less than 20% by weight, especially less than 10% by weight of water-soluble dispersing agents.

The printing pastes according to the invention contain, in addition to at least one finely dispersed water-insoluble azo dyestuff of formula I and at least one reactive dyestuff, also at least one non-ionic surfactant. Besides this, they can also contain the common thickening agents and the common auxiliary agents necessary for the fixation of the reactive dyestuffs which are all very well known to the person skilled in the art and therefore do not need to be listed here. Generally, the printing pastes also contain dispersing agents which are likewise known per se, e.g.: dispersing agents from the classes of the sulfated alcohols, fatty acids and fatty acid esters; the acidic esters of addition products of ethylene oxide on fatty amines, fatty acids or aliphatic alcohols; as well as the sulfated esterified polyhydroxy compounds.

Examples of non-ionic surfactants used according to the invention are as follows:

(1) Addition products of preferably 5 to 50 moles of optionally substituted alkylene oxides, preferably ethylene oxide, on higher fatty acids or on saturated or unsaturated alcohols, mercaptans or amines with 8 to 20 carbon atoms or on alkylphenols or alkylthiophenols, the alkyl radicals of which contain at least 7 carbon atoms. A part of the ethylene oxide units can be replaced by substituted ethylene oxide units, such as styrene oxide and/or propylene oxide units.

(2) Esters of polyalcohols, especially mono- or diglycerides of fatty acids with 12 to 18 carbon atoms, e.g. monoglycerides of lauric acid, stearic acid, palmitic acid or oleic acid, as well as the fatty acid esters of sugar alcohols, anhydrosugar alcohols and sugars, such as sorbitol, the sorbitans and sucrose, for example sorbitan monolaurate (Span ® 20), sorbitan palmitate (Span ® 40), sorbitan stearate (Span ® 60), sorbitan oleate (Span ® 80), sorbitan sesquioleate, sorbitan trioleate (Span ® 85) or their ethoxylation products (Tweens ® ). Span ® and Tween ® are trademarks of ICI of America, Inc., Atlas Chemicals Division.

(3) Reaction products of higher molecular weight fatty acids with hydroxyalkylamines. These can be prepared e.g. by reacting higher molecular weight fatty acids, preferably fatty acids with about 8 to 20 carbon atoms, e.g. caprylic acid, stearic acid, oleic acid and in particular the mixture of fatty acids called "coconut oil fatty acids" with hydroxyalkylamines, such as triethanolamine or preferably diethanolamine, or mixtures of hydroxyalkylamines, the mole ratio of hydroxyalkylamine to fatty acid being larger than 1, e.g. 2:1. Such reaction products are described in U.S. Pat. No. 2,089,212.

(4) Condensation products of optionally substituted alkylene oxides, especially ethylene oxide. A part of the ethylene oxide units can be replaced by substituted ethylene oxide units, such as styrene oxide and/or propylene oxide units.

The use of non-ionic surfactants on the basis of ethoxylated fatty alcohols, especially addition products of from 10 to 25 moles of ethylene oxide on alcohols with 11 to 18 carbon atoms, has proved particularly favourable to carry out the process. The non-ionic surfactants are added to the printing paste, preferably in amounts of from 1 to 10% by weight.

Anionic water-soluble dyestuffs from the most various classes are suitable as reactive dyestuffs, but mainly phthalocyanine, anthraquinone and azo dyestuffs which bear fiber reactive groups which are capable of reacting with the cellulose molecule under formation of covalent bonds. Such dyestuffs are described in the Colour Index, published by The Society of Dyers and Colorists, under the title "Reactive Dyes".

The printing pastes according to the invention are stable on storage at a storage temperature of from about −15° to +40° C. for about 1 to 2 months and are suitable for use in printing unions consisting of mixtures of fibers which can be coloured with disperse dyestuffs and fibers which can be coloured with reactive dyestuffs. Examples of such textile materials are woven, knitted and non-woven fabrics. Examples of fibers which can be coloured with disperse dyestuffs are polyesters, such as polyethylene terephthalate. Examples of fibers which can be coloured with reactive dyestuffs are cellulose fibers, such as linen and especially cotton.

The process according to the invention can be carried out so that the unions are printed in the normal way with the printing paste and subjected to an intermediate drying operation in the normal way and the dyestuffs are then fixed to the unions.

The fixation of both types of dyestuffs can take place simultaneously according to the same method, for example by thermal fixation or steaming at high temperature, or also consecutively according to the methods which are usual for the two dyestuff types, for example by pressure steaming for the disperse dyestuffs and by short treatment in a boiling, highly alkaline bath containing electrolytes, batching (at ambient temperature) or separate application of dyestuffs and fixing chemicals and fixation by steaming for the reactive dyestuffs.

After fixation, the print can be finished in the usual way. All the measures mentioned above in connection with the process according to the invention are well known to the person skilled in the art and therefore do not have to be further explained here.

One obtains, according to the process of the invention, prints with the above-mentioned advantageous properties, in particular easier washability especially of the disperse dyestuff and an excellent white ground with good build-up and fastness properties. The prints are especially brilliant and deep in colour in the range of orange and red shades.

The following Examples illustrate the invention without limiting it. In the Examples, the reactive dyestuffs are used in the commercially available form. Parts are parts by weight.

EXAMPLE 1

25 parts of the monoazo dyestuff melting at 284° C. and having the formula:

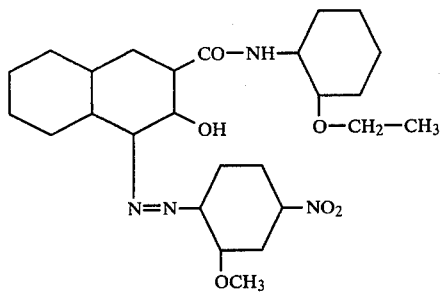

are stirred into a solution of 5 parts of the disodium salt of dinaphthylmethanedisulfonic acid and 10 parts of propylene glycol in 60 parts of water. The suspension obtained is ground in an agitator ball mill filled with glass balls of 1 mm diameter until the average particle size of the dyestuff is below 1 μm (micron).

A printing paste is prepared from 65 parts of the dyestuff composition obtained according to the above data, 40 parts of Colour Index Reactive Red 24, 100 parts of urea, 30 parts of the addition product of 18 moles of ethylene oxide on a commercial mixture of fatty alcohols with 11 to 18 carbon atoms, 20 parts of sodium hydrogencarbonate and 745 parts of a 4.5%, aqueous sodium alginate solution.

A woven union consisting of 50 parts of polyethylene terephthalate fibers and 50 parts of cotton is printed in the usual way with the resulting printing paste and is then dried at 100° to 110° C. To fix the dyestuffs, the print is treated for 60 seconds at 200° C. with dry, hot air; non-fixed dyestuff portions are subsequently removed by rinsing in cold water and washing at the boil.

A print which is deep in colour and has a brilliant red shade and excellent fastness properties is obtained, both types of fibers being coloured in the same shade and the unprinted parts of the fabric having an excellent white ground due to the very good washability of the non-fixed dyestuff portions.

If the fabric is treated after printing and drying for 8 minutes at 180° C. with superheated steam or for 20 minutes with pressure steam of 1.5 bar, and one proceeds otherwise as before, equally good results are obtained.

For the preparation of the printing paste, the addition product of 18 moles of ethylene oxide on a commercial mixture of fatty alcohols with 11 to 18 carbon atoms can be replaced in the above Example by the same amount of the addition product of 10 moles of ethylene oxide on nonylphenol, with equal success.

EXAMPLE 2

25 parts of the dyestuff melting at 227° C. and having the formula:

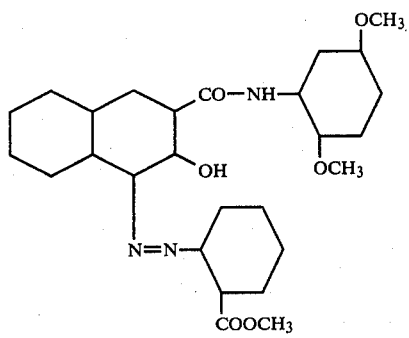

are converted into an aqueous dispersion according to the data in Example 1.

A printing paste is prepared from 70 parts of the resulting dyestuff dispersion, 40 parts of Colour Index Reactive Orange 5 in the commercial form, 100 parts of urea, 30 parts of the addition product of 18 moles of ethylene oxide on a commercial mixture of fatty alcohols with 11 to 18 carbon atoms, 25 parts of sodium carbonate, 5 parts of 2-ethyl-hexanol and 730 parts of a 4.5%, aqueous sodium alginate solution.

A woven union consisting of 67 parts of polyethylene terephthalate fibers and 33 parts of cotton is printed with the resulting printing paste and finished according to the data of Example 1.

An orange print which is deep in colour is obtained; both types of fibers are coloured in the same shade. The print is distinguished by particularly easy washability of non-fixed dyestuff portions; in the same way, the unprinted parts of the fabric have an excellent white ground after the washing process.

If the electrophilic methoxycarbonyl group is replaced in the formula of the monoazo dyestuff mentioned above by the nucleophilic methyl group, all other structural features remaining as before, a dyestuff is obtained with a melting point of 189° C. which, if used in the same way, stains the white ground strongly during washing and additionally gives a print with comparatively lower light fastness.

EXAMPLE 3

One proceeds in the same way as in Example 2, replacing the azo pigment used therein by the dyestuff melting at 254° C. and having the formula:

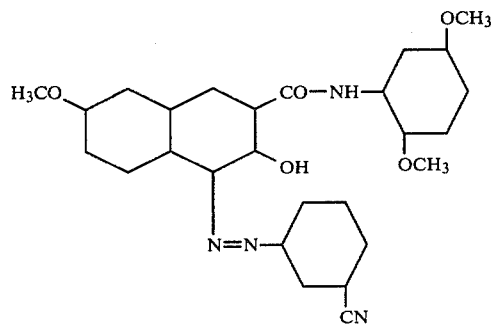

and replacing the reactive dyestuff used therein by the same amount of Colour Index Reactive Red 24 in commercially available form. A red print which is deep in colour is obtained having otherwise equally good fastness properties and excellent white ground.

The following Table contains further examples of monoazo dyestuffs of formula I which can be used in combination with reactive dyestuffs according to the procedures described in Examples 1 to 3, whereby the azo dyestuffs can, according to the data in Swiss Patent Application No. 11728/77 (U.S. Patent Application Ser. No. 946,014), be converted into 25 to 50%, liquid dyestuff compositions, which can be employed in the preparation of the printing paste.

| Example | | Melting point and shade |
|---|---|---|
| 4 | [structure] | 283° C. red |
| 5 | [structure] | 254° C. bordeaux |
| 6 | [structure] | 295° C. scarlet |
| 7 | [structure] | 291° C. scarlet |
| 8 | [structure] | 276° C. yellowish red |

-continued
| Example | | Melting point and shade |
|---|---|---|
| 9 | 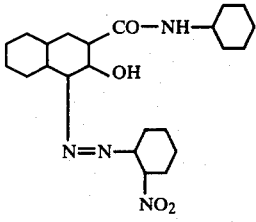 | 275° C. orange |
| 10 | 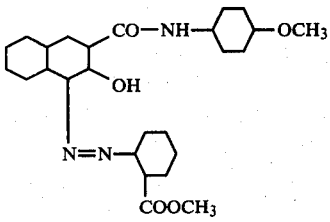 | 255° C. orange red |
| 11 | 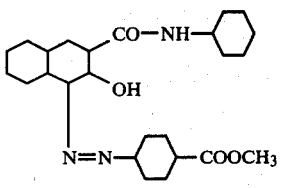 | 247° C. scarlet red |
| 12 | 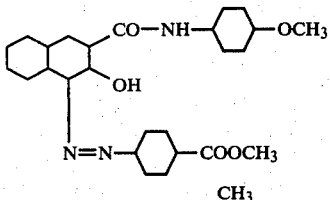 | 251° C. scarlet red |
| 13 | 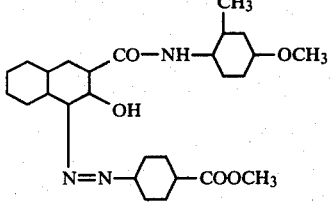 | 229° C. scarlet red |
| 14 | 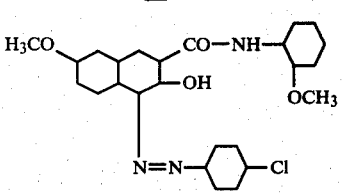 | 230° C. bluish red |
| 15 | 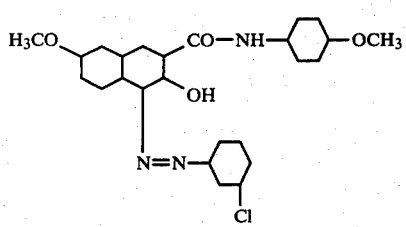 | 228° C. bluish red |
| 16 | 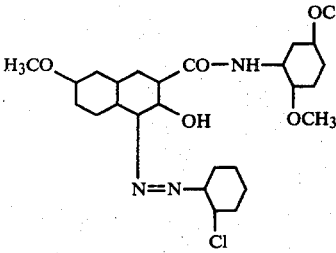 | 234° C. bluish red |

-continued
| Example | | Melting point and shade |
|---|---|---|
| 17 | 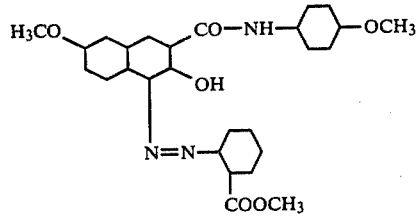 | 260° C. bluish red |
| 18 | 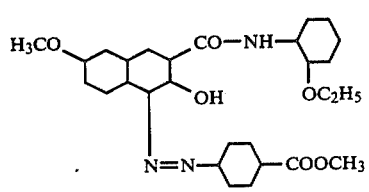 | 245° C. bordeaux |
| 19 | 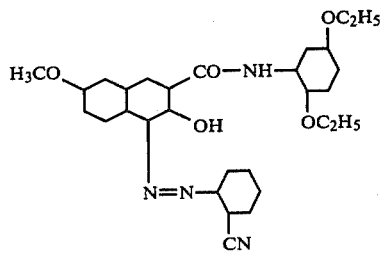 | 228° C. bordeaux |
| 20 | 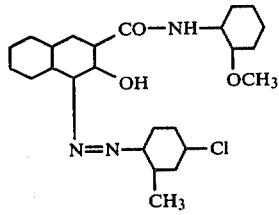 | 272° C. yellowish red |
| 21 | 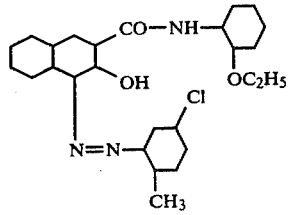 | 260° C. yellowish red |
| 22 | 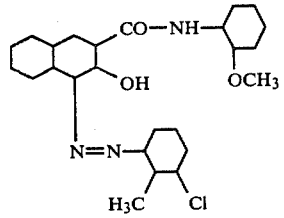 | 248° C. scarlet |
| 23 | 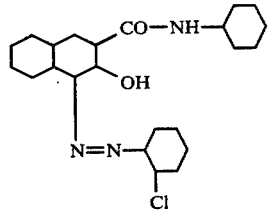 | 250° C. orange |

-continued

| Example | Structure | Melting point and shade |
|---|---|---|
| 24 | 3-hydroxy-4-[(4-chlorophenyl)azo]-2-naphthoic acid (4-methoxyphenyl)amide | 235° C. orange |
| 25 | 3-hydroxy-4-[(4-chlorophenyl)azo]-2-naphthoic acid (2-methylphenyl)amide | 243° C. scarlet |
| 26 | 3-hydroxy-4-[(2,5-dichlorophenyl)azo]-2-naphthoic acid (2,5-dimethoxyphenyl)amide | 270° C. scarlet |
| 27 | 3-hydroxy-4-[(4-chloro-2-methoxyphenyl)azo]-2-naphthoic acid cyclohexylamide | 250° C. bluish red |
| 28 | 3-hydroxy-4-[(2-nitrophenyl)azo]-2-naphthoic acid (2,5-dimethoxyphenyl)amide | 270° C. brownish red |
| 29 | 3-hydroxy-4-[(2-nitrophenyl)azo]-2-naphthoic acid (4-methoxy-2-methylphenyl)amide | 272° C. brownish red |
| 30 | 3-hydroxy-4-[(2-methoxy-4-nitrophenyl)azo]-2-naphthoic acid cyclohexylamide | 287° C. red |

| Example | Melting point and shade |
|---|---|
| 31 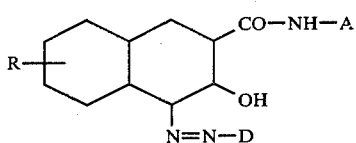 | 286° C. orange |

What is claimed is:

1. A process for printing unions consisting of mixtures of fibers which can be coloured with disperse dyestuffs and fibers which can be coloured with reactive dyestuffs, characterized by using a printing paste containing at least one finely dispersed, water-insoluble azo dyestuff of the formula:

(I)

which is not prepared in the printing paste and which has a melting point between 220° and 300° C. and wherein D is a phenyl radical free from sulfo and carboxyl groups and bearing at least one electrophilic substituent and optionally up to two low molecular weight alkyl and/or alkoxy groups, R is hydrogen, a halogen atom or an optionally substituted alkoxy group and A is a phenyl radical which can be substituted by one or two optionally substituted alkyl and/or alkoxy groups and/or one halogen atom as well as at least one reactive dyestuff at least one non-ionic surfactant, and by applying the printing paste to the unions in a manner known per se.

2. A process according to claim 1, characterized in that the radical D bears as electrophilic substituent at least one nitro, cyano, trifluoromethyl and/or alkoxycarbonyl group and/or up to two halogen atoms.

3. A process according to claim 1 or 2, characterized in that the alkyl substituents in the radicals A and D are methyl and/or ethyl groups and the alkoxy substituents in the radicals A and D are methoxy and/or ethoxy groups.

4. A process according to claim 1 or 2, characterized in that the halogen atoms are chlorine and/or bromine atoms.

5. A process according to claim 1 or 2, for printing polyester/cellulose unions.

6. A process according to claim 1 or 2, characterized in that the azo dyestuff has a particle size below 10 μm (microns).

7. A process according to claim 1 or 2, characterized in that the printing paste contains the azo dyestuff in the form of at least one liquid composition containing at least 20% by weight of dyestuff and less than 20% by weight of water-soluble dispersing agents.

8. A process according to claim 1 or 2, characterized by using a printing paste containing 1 to 10% by weight of at least one non-ionic surfactant.

9. A process according to claim 8, characterized by using as the non-ionic surfactant an addition product of at least one optionally substituted alkylene oxide on higher fatty acids or alcohols with 8 to 20 carbon atoms.

10. A printing paste for carrying out the process according to claim 1 or 2, characterized in that it contains at least one finely dispersed, water-insoluble azo dyestuff of formula I which is not prepared in the printing paste and has a melting point between 220° and 300° C., at least one reactive dyestuff and 1 to 10% by weight of a non-ionic surfactant.

11. A printing paste according to claim 10, characterized in that non-ionic surfactant is an addition product of at least one optionally substituted alkylene oxide on higher fatty acids or alcohols with 8 to 20 carbon atoms.

12. A union printed by means of the process according to claim 1 or 2.

13. A process according to claim 5 for printing polyester/cotton unions.

14. The process according to claim 6, characterized in that the azo dyestuff has a particle size below 2 μm (microns).

15. The process according to claim 7, characterized in that the printing paste contains the azo dyestuff in the form of at least one liquid composition containing 40 to 50% by weight of dyestuff and less than 10% by weight of water-soluble dispersing agents.

16. The process according to claim 9, wherein said optionally substituted alkylene oxide is ethylene oxide.

17. The printing paste according to claim 11, wherein said alkylene oxide is ethylene oxide.

* * * * *

UNITED STATES PATENT AND TRADEMARK OFFICE
CERTIFICATE OF CORRECTION

PATENT NO. : 4,226,596
DATED : October 7, 1980
INVENTOR(S) : Richard Peter et al.

It is certified that error appears in the above—identified patent and that said Letters Patent is hereby corrected as shown below:

Claim 11, line 2, after "that" and before "non-ionic" insert --the--.

Signed and Sealed this

Sixth Day of January 1981

|SEAL|

Attest:

SIDNEY A. DIAMOND

Attesting Officer

Commissioner of Patents and Trademarks